Patented Sept. 15, 1942

2,296,199

UNITED STATES PATENT OFFICE 2,296,199

STABILIZING SOLUTIONS OF TETRA-ALKYL LEAD COMPOUNDS

Troy Lee Cantrell, Lansdowne, and Carlton Louis Suplee, Malvern, Pa., assignors to Gulf Oil Corporation, Pittsburgh, Pa., a corporation of Pennsylvania No Drawing. Application January 31, 1940, Serial No. 316,687

11 Claims. (Cl. 44—63)

This invention relates to stabilizing solutions of tetra-alkyl lead compounds; and it comprises a method of stabilizing such solutions, particularly ethyl gasoline, whereby the development of a hazy appearance is inhibited, by adding to such solutions small quantities of furyl azomethine compounds; all as more fully hereinafter set forth and as claimed.

It is customary in the production of so-called "ethyl gasoline" to add to a good grade of gasoline a small amount of a tetra-alkyl lead compound, usually tetra-ethyl lead, to reduce the tendency of the gasoline to cause knocking in high compression gasoline engines. The amount of tetra-alkyl lead compound added to a gasoline depends upon the nature of the gasoline and the desired anti-knock rating. Tetra-ethyl lead is customarily added to the gasoline in the form of a concentrate called "ethyl fluid," which usually is a solution containing a mixture of tetra-ethyl lead, alkyl di-halide (e. g. ethyl di-bromide or ethyl di-chloride, or both) and a small amount of a dye to impart a distinctive color to the gasoline. The function of the alkyl di-halides is to limit the formation of lead oxide from tetra-alkyl lead in the cylinders of the engine by forming volatile halides of lead which are carried out in the exhaust. The ethyl fluid is added to the gasoline in a quantity sufficient to product the desired anti-knock rating and in some cases a relatively small amount may be required, while in other cases, for example, in the preparation of certain aviation grades of gasoline, a relatively large amount may be added. Gasoline to which a large amount of tetra-ethyl or other tetra-alkyl lead has been added is often referred to as a "heavily leaded" gasoline.

Although tetra-alkyl lead compounds, and, in particular tetra-ethyl lead, are particularly efficient for imparting anti-knock properties to gasoline, their employment is not entirely free from disadvantage. For one thing, leaded gasoline tends to develop a hazy appearance upon standing, particularly in the presence of strong sunlight. For example, in direct sunlight in the summer time, ethyl gasoline may develop a perceptible haziness after an hour or two of exposlure, and longer periods of exposure result in a very marked haziness. This phenomenon is also sometimes observed in the ethyl fluid itself.

The formation of haze in gasoline is objectionable because the gasoline is not as marketable as a clear product; customers prefer a product which is crystal clear. A further and perhaps more important objection is that a reduction in the octane rating of gasoline is frequently associated with haze formation. Also damage is likely to occur in the fuel lines and carburetor. The development of haze in ethyl fluid itself is also objectionable, because when a hazy ethyl fluid is blended with gasoline to form ethyl gasoline, the haze is introduced into the fuel with all its attendant disadvantages.

An object achieved by this invention is to provide solutions of tetra-alkyl lead compounds, such as ethyl fluid and ethyl gasoline, which are stabilized against haze formation.

We have found that haze formation in solutions of tetra-alkyl lead compounds, such as ethyl fluid and ethyl gasoline, can be very materially reduced, by incorporating in such solutions small quantities, proportioned on the amount of tetra-alkyl lead compound in solution, of a compound having the formula

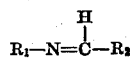

wherein $R_1$ is a carbocyclic aromatic group directly attached to the nitrogen atom, and which may contain various substituents such as hydroxyl, amino, imino, nitro, chloro and alkyl and $R_2$ is a furyl, furalkyl, or furalkylene radical, which may also contain various substituents. These stabilizing substances are, for convenience, herein referred to as "furyl-azo-methine compounds" since they contain the furyl group and the azo-methine group, —N=CH—.

These furyl azo-methine compounds, derivable from furfuraldehyde, are in general considerably more powerful haze inhibitors for ethyl gasoline, ethyl fluid, and the like than are the corresponding benzal azo-methines derived from benzaldehyde.

The furyl azo-methine compounds may be added with advantage to solutions generally of tetra-alkyl lead compounds and more particularly to all types of leaded gasoline. The manner of incorporating the furyl azo-methine compounds in solutions of tetra-alkyl lead compounds is not critical. They may be incorporated in the ethyl fluid at any stage during the preparation thereof or they may be incorporated in the gasoline prior to the addition of ethyl fluid, along with the ethyl fluid, or subsequent to blending the ethyl fluid with the gasoline.

Even very small quantities of furyl azo-methine compounds are sufficient to exert a substantial stabilizing effect against light in fluids containing tetra-alkyl lead compounds. However, the amounts of different furyl azo-methine compounds necessary to be added to a leaded gasoline will differ because the stabilizing potencies of these compounds are not uniform. In general, with higher percentages of tetra-alkyl lead compound in a fluid, greater amounts of furyl azo-methine compounds are required. Within the range of about 0.01 to about 1.00 per cent by weight of tetra-ethyl lead in gasoline, a substantial stabilizing effect is exerted by from about 3 to about 60 pounds of a furyl azo-methine compound per 1000 barrels of gasoline. Within the range from about 0.02 to about 0.40 per cent by weight of tetra-ethyl lead in gasoline, which represents a commercial range, it is advantageous to employ from about 5 to about 20 pounds of such furyl azo-methine compounds per 1000 barrels of gasoline. Such amounts will exert a marked stabilizing effect against light and will produce a commercial ethyl gasoline which is satisfactorily stable to light under the usual conditions of exposure.

The application of the furyl azo-methine compounds to the stabilization of solutions of tetra-alkyl lead compounds against haze formation is not limited to leaded gasolines, and they may be incorporated directly in the ethyl fluid with advantage. When these compounds are incorporated in the tetra-alkyl lead concentrate, they stabilize it during storage and shipment, and a concentrate containing a furyl azo-methine compound can then be added to gasoline to impart thereto both anti-knock properties and resistance to haze formation. In such case the amount of furyl azo-methine compound incorporated in the ethyl fluid is generally somewhat greater than is required for stabilization of the concentrate so that by the addition of the usual small amount of ethyl fluid to the gasoline a suitable stabilizing amount of furyl azo-methine compound will be incorporated in the gasoline. Generally, from 1 to 10 per cent by weight, based on the tetra-ethyl lead of furyl azo-methine compound very satisfactorily stabilizes commercial tetra-ethyl lead concentrates, such as ethyl fluid, and on adding the stabilized concentrate to gasoline to produce ethyl gasoline, a satisfactorily stabilized ethyl gasoline is obtained.

A large variety of furyl azo-methine compounds are capable of use in accordance with this invention. Thus, furyl azo-methine compounds prepared by condensing one mol of furfuraldehyde with one mol of an aromatic amine such as aniline, with the elimination of one mol of water, are useful. Fural-aniline, which has the following structure

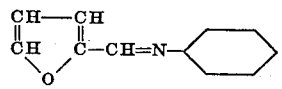

is illustrative. Similar furyl azo-methine compounds wherein the aromatic nuclei contain substituent groups such as alkyl, hydroxyl, nitro, chloro, dimethylamino, azo-aryl and alkoxy may also be used as haze inhibitors. Moreover, polynuclear carbocyclic groups may take the place of the simple benzene ring of fural-aniline, for example, naphthalene and diphenyl.

Furyl azo-methine compounds wherein the furfuraldehyde residue of fural-aniline is replaced by a condensation product of furfuraldehyde with an aliphatic aldehyde such as acetaldehyde may also be employed as haze inhibitors. Thus furfuracrylaldehyde, which is conveniently formed by condensing one mol of furfuraldehyde with one mol of acetaldehyde with the elimination of one mol of water, may be combined with aniline or another aromatic amine to form effective haze inhibitors. Furfuracrylidene aniline, which may be represented as follows:

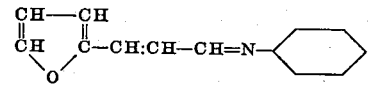

is illustrative of this further type of suitable azo-methine compound.

Also, the furyl azo-methine stabilizers within the scope of this invention are not restricted to those derived from mono-amines such as aniline and its homologues and substitution products, but may include those azo-methine compounds derived from polyamines such as the phenylene diamines, benzidine and the tolidines. In such cases more than one of the amino groups may be condensed with furfuraldehyde or its substitution products and thus azo-methine stabilizers containing a plurality of furyl azo-methine groups are formed and are suitable for the purposes of this invention. Moreover, a mixed type of azo-methine compound, such as fural-benzal-o-tolidine, which is formed by condensing one mol of o-tolidine with one mol of furfuraldehyde and one mol of benzaldehyde, constitutes a satisfactory stabilizer against haze formation.

All of these furyl azo-methine compounds are not equally potent in their stabilizing effect but they all have substantial stabilizing power and in general any of them, when used in an amount between about 3.0 and 60.0 pounds per 1000 barrels of gasoline containing from 0.01 to 1.0 per cent of tetra ethyl lead, will materially increase the period of stability to haze formation.

The furyl azo-methine compounds of our invention, in addition to their stabilizing properties, have other properties which particularly recommend them for this use. They do not adversely affect the oxygen stability of gasoline. Samples of cracked ethyl gasoline containing furyl azo-methine compounds have been aged and tested for oxygen stability and by the copper dish method for gum formation. The presence of the furyl azo-methine compounds did not promote either oxygen instability or gum formation. They are non-corrosive to common packaging materials such as steel, zinc, copper and tin, and are compatible with the dyes commonly used in ethyl gasoline to give it a distinctive appearance. All of them are sufficiently soluble in gasoline to accomplish the intended stabilization. Furthermore, they are insoluble in water, which is a distinct advantage because contact with water will not result in leaching them out of the gasoline. Continued storage of gasoline containing furyl azo-methine compounds does not affect their stabilizing properties. Also, they can be readily prepared from compounds available on the market at a relatively small cost, and their mode of preparation is simple and inexpensive. In particular, furfuraldehyde is a very cheap substance and it reacts very readily with aromatic amines to produce powerful stabilizers against haze formation. When combined with a cheap amine such as aniline or xylidine, it provides a highly satisfactory and very economical means of stabilizing ethyl gasoline, ethyl fluid and the like against haze formation.

The following specific examples will serve to illustrate the excellent haze-inhibiting properties of certain of the furyl azo-methine compounds:

*Example 1.*—Ethyl gasoline containing 0.1 per cent by weight of tetra-ethyl lead (added in the form of ethyl fluid comprising tetra-ethyl lead, ethylene dibromide, and a dye) was treated with fural-aniline in the proportion of 10 pounds of the latter per 1000 barrels of gasoline. The resulting solution was exposed for five hours to sunlight and the appearance of the gasoline was noted. At the end of the 5-hour exposure there was a very small degree of haziness but a great improvement over the appearance of the same gasoline containing no fural-aniline, which developed a heavy precipitate. This was considered to be a good stabilization.

Example 2.—Fural-xylidine having the structure

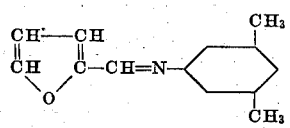

ture and fural-p-toluidine were tested in the same brand of gasoline in the same amount and under the same conditions as in Example 1. Both substances achieved a good stabilization, the fural-xylidine being somewhat superior to the fural-p-toluidine. However, the latter produced an ethyl gasoline which exhibited only a small degree of haziness at the end of the 5-hour exposure, whereas the unstabilized ethyl gasoline developed a heavy precipitate.

Example 3.—Difural-o-tolidine, having the structure

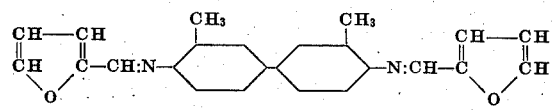

fural benzal-o-tolidine, having the structure

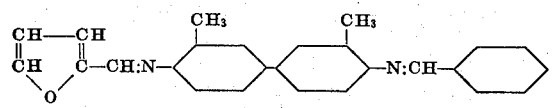

and furfuracrylidene aniline, whose structure is given above, were tested in precisely the same manner as in Example 1. The fural-o-tolidine achieved a good stabilization, better than that achieved by fural-aniline and fural-xylidine, while the fural-benzal-o-tolidine and the furfuracrylidene aniline achieved an even better stabilization. The ethyl gasoline at the end of the 5-hour exposure, in the case of the latter two stabilizers, was perfectly bright and clear.

While our invention has been described herein with reference to particular embodiments and specific examples thereof, we do not intend that our invention shall be limited to such embodiments and examples except as hereinafter defined in the appended claims.

What we claim is:

1. A method of producing a light stable solution of a tetra-alkyl lead compound, which comprises incorporating in said solution, in a quantity sufficient to inhibit the formation of haze therein, a substance represented by the formula

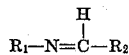

wherein $R_1$ represents a carbocyclic aromatic radical directly attached to the nitrogen atom, and $R_2$ represents a radical selected from the class consisting of furyl, furalkyl, and furalkylene, and $R_1$ and $R_2$ may be substituted radicals.

2. A method of producing a light stable anti-knock motor fuel containing a tetra-alkyl lead compound, which comprises incorporating in said motor fuel, a haze inhibitor represented by the formula

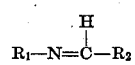

wherein $R_1$ represents a carbocyclic aromatic radical directly attached to the nitrogen atom, and $R_2$ represents a radical selected from the class consisting of furyl, furalkyl, and furalkylene, and $R_1$ and $R_2$ may be substituted radicals, in an amount corresponding to 0.01 to 1.0 per cent by weight of the tetra-alkyl lead compound.

3. The method of claim 2, wherein said motor fuel contains between about 0.02 and about 0.4 per cent by weight of tetra-ethyl lead, and the haze inhibitor is added in an amount from about 5 to about 20 pounds per 1000 barrels of motor fuel.

4. A method of producing a light stable motor fuel containing a tetra-alkyl lead compound, which comprises incorporating in said motor fuel a quantity of a haze inhibiting substance represented by the formula

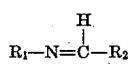

wherein $R_1$ represents a carbocyclic aromatic radical directly attached to the nitrogen atom, and $R_2$ represents furalkylene radical, and $R_1$ and $R_2$ may be substituted radicals, corresponding to about 0.01 to 1.0 per cent by weight of the tetra-alkyl lead compound.

5. A method of producing a light stable motor fuel containing a tetra-alkyl lead compound, which comprises incorporating in said motor fuel a quantity of a haze inhibiting substance represented by the formula

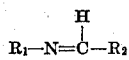

wherein $R_1$ represents a carbocyclic aromatic radical directly attached to the nitrogen atom and $R_2$ represents a furyl radical directly attached to the carbon atom, and $R_1$ and $R_2$ may be substituted radicals, corresponding to about 0.01 to 1.0 per cent by weight of the tetra-alkyl lead compound.

6. The method of claim 5 wherein said added substance is fural-aniline.

7. The method of claim 4 wherein said added substance is furfuracrylidene aniline.

8. As an improved anti-knock motor fuel stable to light, a gasoline containing a tetra-alkyl lead compound and a quantity of a haze inhibiting compound represented by the formula

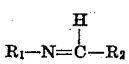

wherein $R_1$ represents a carbocylic aromatic radical directly attached to the nitrogen atom, and $R_2$ represents a radical selected from the class consisting of furyl, furalkyl, and furalkylene, and $R_1$ and $R_2$ may be substituted radicals, corresponding to 0.01 to 1.0 per cent by weight of the tetra-alkyl lead compound.

9. As an improved anti-knock motor fuel stable to light, a gasoline containing 0.02 to 0.40 per cent by weight of tetra-ethyl lead and about 5 to 20 pounds per 1000 barrels of a haze inhibiting compound represented by the formula

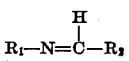

wherein $R_1$ represents a carbocyclic aromatic radical directly attached to the nitrogen atom and R₂ represents a furyl radical directly attached to the carbon atom, and R₁ and R₂ may be substituted radicals.

10. The improved motor fuel of claim 9, wherein the haze inhibiting compound is fural-aniline.

11. As an improved anti-knock motor fuel stable to light, a gasoline containing 0.02 to 0.4 per cent by weight of tetra-ethyl lead and 5 to 20 pounds per 1000 barrels of furfuracrylidene aniline.

TROY LEE CANTRELL.
CARLTON LOUIS SUPLEE.